UNITED STATES PATENT OFFICE.

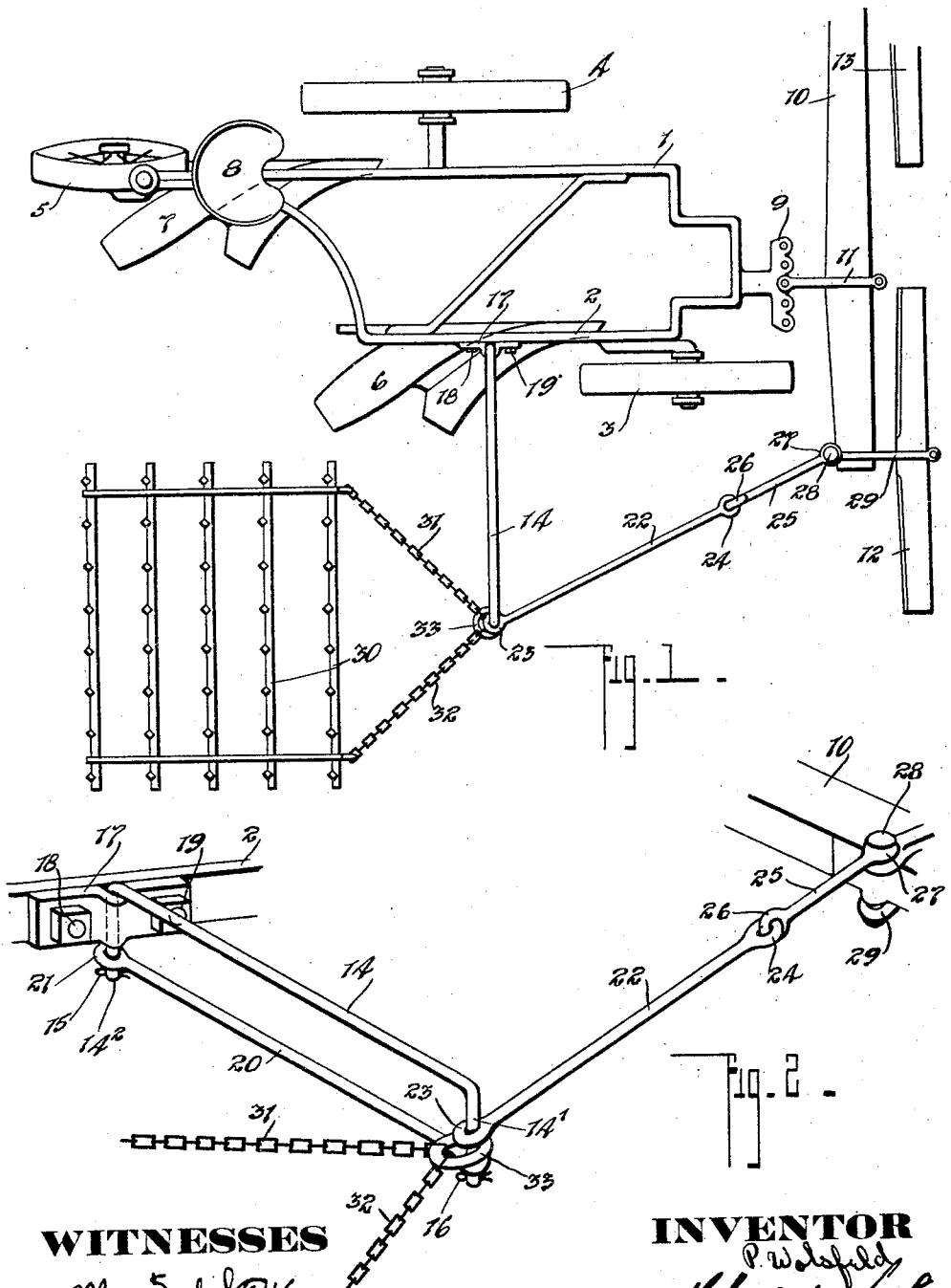

PETER WOLSFELD, OF LENORA LAKE, SASKATCHEWAN, CANADA.

ATTACHMENT TO PLOWS.

1,235,176.   Specification of Letters Patent.   Patented July 31, 1917.

Application filed September 27, 1916. Serial No. 122,514.

*To all whom it may concern:*

Be it known that I, PETER WOLSFELD, of the village of Lenora Lake, in the Province of Saskatchewan, Canada, have invented certain new and useful Improvements in Attachments to Plows, of which the following is the specification.

The invention relates to improvements and attachments to plows and the object of the invention is to provide an attachment whereby a farm implement such as a harrow can be readily attached to the plow and drawn with the same to effect the harrowing of the ground at the same time as the plowing.

With the above object in view the invention consists essentially in the arrangement and construction of parts hereinafter more particularly described and later pointed out in the appended claim reference being had to the accompanying drawings in which;

Figure 1 represents a plan view of the attachment as applied to a plow and Fig. 2 a perspective view of the various parts of the attachment.

In the drawing like characters of reference indicate corresponding parts in each figure.

1 represents the usual form of gang plow presenting a frame 2, carriage wheels 3 and 4, a swivel wheel 5, plows 6 and 7, seat 8, adjusting head 9 and double tree 10 connected by means of links 11 to the head.

The double trees carry the swingle trees 12 and 13 as is usual.

My attachment is applied to the plow in the manner now described:

14 represents a cross rod having the ends thereof down-turned as indicated at 14' and 14² and provided with split pins 15 and 16. The inner end of the rod is pivotally fastened to the side of the plow frame by means of a strap 17 connected by bolts 18 and 19 to the frame. 20 is a second cross rod having the ends formed into eyes 21 which are received by the down-turned ends of the rod 14, the second rod being held in position by the split pins.

22 is a draft rod having the ends thereof formed into eyes 23 and 24, the eye 23 being connected to the down-turned end 14' of the rod 14.

25 is a short link having the ends thereof formed into eyes 26 and 27, the eye 26 being connected to the eye 24 while the eye 27 is received by a pin 28 carried by the adjoining end of the double tree, this pin also fastening the ordinary swingle tree clevis as indicated at 29.

30 represents a drag harrow of any improved construction.

31 and 32 are draft chains having their rear ends connected to the outer corners of the harrow and their forward ends brought together and fastened to a ring 33. The ring is mounted on the end 14' of the rod 14 between the eye 23 and the adjoining end of the rod 20.

With this attachment it will be seen that the harrow will be drawn with the plow and that it will harrow the furrow turned by the plow.

According to the arrangement there is no difficulty experienced in turning as the various parts swing to accommodate the turn when it is made.

What I claim as my invention is:—

The combination with a plow, the double tree thereof and a harrow associated with the plow at the furrow side thereof, of a cross rod having the ends thereof down-turned and one end pivotally secured by means of a strap to the furrow side of the plow frame, a second cross rod connecting the down-turned ends of the former rod and held in position by split pins carried by the said down-turned ends, a ring secured to the free down-turned end of the former cross rod, a chain connection between the ring and the outer forward corners of the harrow, a draft rod having the rear connected with the latter end of the said latter cross rod and a link connecting the forward end of the draft rod with the adjoining end of the double tree, as and for the purpose specified.

Signed at Humboldt this 14th day of June, 1916.

PETER WOLSFELD.

In the presence of—
PETER SCHIHAWSKY,
E. THORNBERG.

Copies of this patent may be obtained for five cents each, by addressing the "Commissioner of Patents, Washington, D. C."